United States Patent
Gupta et al.

(10) Patent No.: US 10,012,062 B2
(45) Date of Patent: Jul. 3, 2018

(54) METHOD OF FRACTURING WITH LIQUEFIED NATURAL GAS

(71) Applicant: Baker Hughes, a GE company, LLC, Houston, TX (US)

(72) Inventors: D. V. Satyanarayana Gupta, The Woodlands, TX (US); Harold Dean Brannon, Magnolia, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 602 days.

(21) Appl. No.: 14/186,643

(22) Filed: Feb. 21, 2014

(65) Prior Publication Data
US 2014/0246199 A1 Sep. 4, 2014

Related U.S. Application Data

(60) Provisional application No. 61/772,060, filed on Mar. 4, 2013.

(51) Int. Cl.
*E21B 43/26* (2006.01)
*E21B 36/00* (2006.01)
*E21B 43/16* (2006.01)
*C09K 8/565* (2006.01)
*C09K 8/64* (2006.01)

(52) U.S. Cl.
CPC ............ *E21B 43/26* (2013.01); *C09K 8/565* (2013.01); *C09K 8/64* (2013.01); *E21B 43/168* (2013.01)

(58) Field of Classification Search
CPC ...... E21B 36/00; E21B 36/001; E21B 43/166; E21B 43/168; E21B 43/162; E21B 43/26; C09K 8/594; C09K 8/62; C09K 8/70; C09K 8/80

USPC ............ 166/302, 271, 308.1, 308.2
See application file for complete search history.

(56) References Cited

U.S. PATENT DOCUMENTS

| | | | |
|---|---|---|---|
| 3,822,747 A | 7/1974 | Maguire, Jr. | |
| 4,569,394 A * | 2/1986 | Sweatman | E21B 43/267 166/280.1 |
| 5,002,125 A * | 3/1991 | Phillips | E21B 43/26 166/271 |
| 5,417,287 A | 5/1995 | Smith et al. | |
| 5,571,315 A | 11/1996 | Smith et al. | |
| 5,614,010 A | 3/1997 | Smith et al. | |
| 5,647,900 A | 7/1997 | Smith et al. | |
| 6,138,760 A | 10/2000 | Lopez et al. | |
| 6,269,656 B1 * | 8/2001 | Johnston | F25J 1/0022 62/611 |

(Continued)

FOREIGN PATENT DOCUMENTS

WO  2012097425 A1  7/2012

OTHER PUBLICATIONS

R.E. Hurst; "Gas Frac—A New Stimulation Technique Using Liquid Gases"; SPE 3837; 1972; pp. 1-7; Society for Petroleum Engineers, Dallas, Texas.

(Continued)

*Primary Examiner* — Kenneth L Thompson
(74) *Attorney, Agent, or Firm* — John Wilson Jones; Jones Delflache LLP

(57) ABSTRACT

The production of hydrocarbons from a hydrocarbon bearing formation is enhanced by introduction into the formation a non-aqueous fluid containing a liquefied natural gas.

22 Claims, 2 Drawing Sheets

Wellsite 100

(56) References Cited

U.S. PATENT DOCUMENTS

| | | | |
|---|---|---|---|
| 6,302,209 B1 | 10/2001 | Thompson, Sr. et al. | |
| 6,517,286 B1 * | 2/2003 | Latchem | F17C 1/007 |
| | | | 166/335 |
| 6,602,828 B2 | 8/2003 | Amin et al. | |
| 6,849,581 B1 | 2/2005 | Thompson et al. | |
| 7,293,611 B2 | 11/2007 | Taylor et al. | |
| 7,341,103 B2 | 3/2008 | Taylor et al. | |
| 7,584,793 B2 * | 9/2009 | Brown | C09K 8/685 |
| | | | 166/300 |
| 7,913,762 B2 | 3/2011 | Wheeler et al. | |
| 7,989,398 B2 | 8/2011 | Bland et al. | |
| 8,084,401 B2 | 12/2011 | Lukocs et al. | |
| 8,196,660 B2 * | 6/2012 | Smith | C09K 8/685 |
| | | | 166/250.01 |
| 8,312,924 B2 * | 11/2012 | Smith | E21B 43/26 |
| | | | 166/259 |
| 8,342,246 B2 * | 1/2013 | Vandor | C09K 8/62 |
| | | | 166/308.2 |
| 8,371,383 B2 | 2/2013 | Bell et al. | |
| 8,443,890 B2 * | 5/2013 | Hoch | C09K 8/516 |
| | | | 166/292 |
| 8,614,171 B2 * | 12/2013 | Hoch | C09K 8/516 |
| | | | 166/305.1 |
| 9,676,994 B2 * | 6/2017 | Kuipers | C09K 8/64 |
| 2005/0277554 A1 * | 12/2005 | Blauch | C09K 8/5083 |
| | | | 507/224 |
| 2006/0065400 A1 | 3/2006 | Smith | |
| 2006/0096756 A1 * | 5/2006 | Weiss | C09K 8/64 |
| | | | 166/279 |
| 2009/0038242 A1 * | 2/2009 | Cope | B65G 47/18 |
| | | | 52/192 |
| 2010/0101796 A1 † | 4/2010 | Leshchyshyn | |
| 2011/0143971 A1 | 6/2011 | Mesher et al. | |
| 2011/0245114 A1 | 10/2011 | Gupta et al. | |
| 2011/0284230 A1 | 11/2011 | Loree et al. | |
| 2012/0000660 A1 | 1/2012 | Gatlin et al. | |
| 2012/0037371 A1 | 2/2012 | Gupta et al. | |
| 2013/0137609 A1 * | 5/2013 | Pierce | C09K 8/70 |
| | | | 507/202 |
| 2013/0341010 A1 † | 12/2013 | Nevison | |
| 2014/0000899 A1 † | 1/2014 | Nevison | |
| 2014/0008074 A1 † | 1/2014 | Nevison | |
| 2014/0034322 A1 * | 2/2014 | Gupta | C09K 8/52 |
| | | | 166/308.3 |
| 2014/0251626 A1 * | 9/2014 | Gomaa | C09K 8/62 |
| | | | 166/308.5 |
| 2015/0101807 A1 * | 4/2015 | Kuipers | C09K 8/64 |
| | | | 166/280.1 |

OTHER PUBLICATIONS

D.V. Gupta; "Unconventional Fracturing Fluids for Tight Gas Reservoirs": SPE 119424; 2009; pp. 1-9; Society of Petroleum Engineers; The Woodlands Texas.

R.E. Hurst; Use of Liquified Gases as Fracture Fluids for Dry Gas Reservoirs: SPE 4116; 1972; pp. 1-12; Society for Petroleum Engineers; Dallas Texas.

Kale Webster; "Current Completion Practices in Tight Reservoirs"; SPE 6379; 1977; pp. 93-100; Society for Petroleum Engineers; Dallas, Texas.

* cited by examiner
† cited by third party

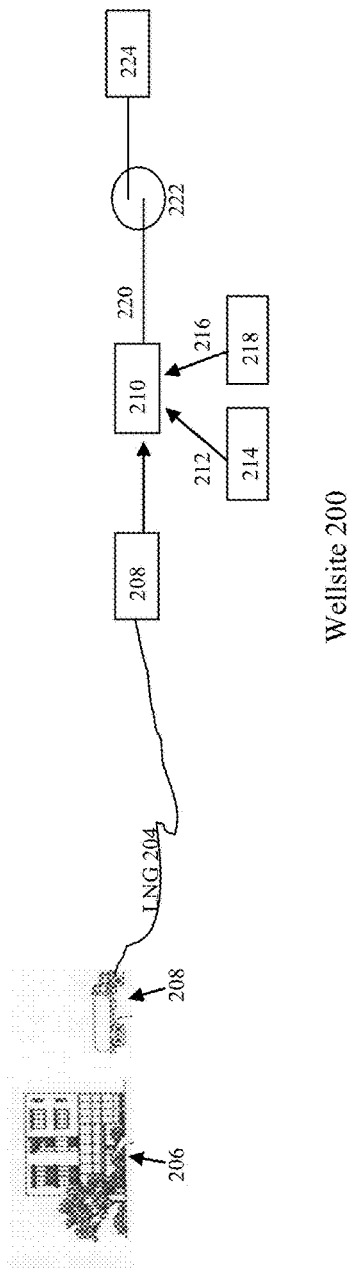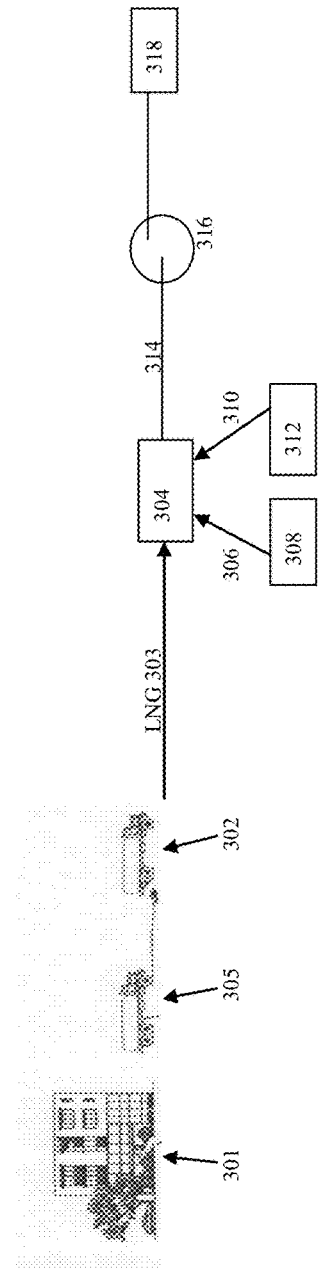
FIG. 2
FIG. 3

METHOD OF FRACTURING WITH LIQUEFIED NATURAL GAS

FIELD OF THE INVENTION

The disclosure relates to a method of enhancing the productivity of a hydrocarbon-bearing subterranean formation with a liquefied natural gas.

BACKGROUND OF THE INVENTION

A common method of increasing productivity of a hydrocarbon-bearing formation penetrated by a well is to subject the formation to stimulation techniques, such as hydraulic fracturing. Fracturing of a subterranean formation is accomplished by pumping a fracturing fluid into the well which penetrates the formation at a sufficient pressure and flow rate such that cracks or fissures are created or enlarged in the surrounding formation. The fracturing fluid typically contains a proppant which functions to prop open fractures such that the fracture provides larger flow channels through which an increased quantity of a hydrocarbon may flow. Productive capability of the well is therefore increased.

In a typical hydraulic fracturing treatment operation, a viscosified fracturing fluid is used which contains at least one water-soluble polymer which has been hydrated in water and which has been chemically modified with a crosslinking agent in order to increase fluid viscosity.

Certain subterranean formations subjected to hydraulic fracturing are however water sensitive. For instance, formations rich in swellable and migrating clays are water sensitive due to the presence of kaolinite, chlorite, illite and mixed layers of illite and smectite.

Further, fracturing fluids which contain water can damage some well formations due to adverse water saturation effects, which can include sub-irreducible water saturation. Water retention issues may be especially acute in tight gas formations which are water-wet and under-saturated where the initial water saturation in the reservoir is less than the capillary equilibrium irreducible water saturation. When exposed to aqueous based fluids, these formations will trap water for long periods of time, if not permanently, especially in the near-wellbore region of the well. The saturation of the formation with water can result in reduced permeability to hydrocarbons, which in turn can cause reduced productivity of the well.

In addition to the increased potential for formation damage from imbibed water, interest in non-aqueous fracturing methods has increased in light of the unavailability of water at the wellsite. Further, certain formations, such as shale, flow back 25 to 40% of fracturing water which has to be handled prior to putting the produced gas on pipeline. Non-aqueous fracturing fluids minimize the concern of flowback water.

In the past, liquid carbon dioxide has been used as a non-aqueous fracturing fluid as well as liquid petroleum gas (LPG). Carbon dioxide, however, is not available in all locations. In addition, after completion of the frac job, the amount of carbon dioxide in the produced fluid typically has to be minimized before produced fluids can start to flow through the pipeline. LPG based fracturing fluids have been operationally successful; however, they carry inherent safety issues.

Alternative non-aqueous fracturing fluids have therefore been desired which minimize environmental and safety risks and which address the complexities presented during fracturing procedures.

SUMMARY OF THE INVENTION

An embodiment of the present disclosure is directed is to a gelled non-aqueous fracturing fluid which contains liquefied natural gas (LNG).

In one embodiment, the fracturing fluid containing LNG is gelled with a phosphate ester.

Another embodiment is directed to a method for enhancing the productivity of a hydrocarbon-bearing formation penetrated by a gas producing well by introducing into the gas producing well a gelled non-aqueous fluid containing LNG.

In an embodiment, the gelled non-aqueous fluid containing LNG is introduced into an onshore gas producing well.

In another embodiment, the disclosure is directed to a method for enhancing the production of hydrocarbons from a hydrocarbon-bearing formation by introducing into a well penetrating the formation a gelled fracturing fluid containing LNG.

In another embodiment, the disclosure is directed to a method for enhancing the production of hydrocarbons from a hydrocarbon-bearing formation by introducing into a well penetrating the formation a fracturing fluid containing LNG and a phosphate ester.

In another embodiment, the disclosure is directed to a method for fracturing a gas producing well penetrating a subterranean hydrocarbon-bearing formation by supplying LNG to the well through a flowline extending from another producing well.

In another embodiment, the disclosure is directed to a method for fracturing an onshore gas producing well penetrating a subterranean hydrocarbon-bearing formation by supplying LNG to the well from a field gathering plant.

In another embodiment, the disclosure is directed to a method for fracturing a gas producing well by supplying LNG to an onshore well through a pipeline which is plumbed to the wellsite of the gas producing well.

In still embodiment, the disclosure is directed to a method for fracturing a gas producing well penetrating a subterranean hydrocarbon-bearing formation by transferring LNG from a storage tank on the wellsite of the gas producing well.

In yet embodiment, the disclosure is directed to a method for fracturing a gas producing well penetrating a subterranean hydrocarbon-bearing formation by supplying LNG transported to a storage tank from a source distant from the wellsite.

Still, the disclosure is directed to a method for fracturing an onshore gas producing well penetrating a subterranean hydrocarbon-bearing formation by supplying LNG to the well from a tanker located at the wellsite.

BRIEF DESCRIPTION OF THE DRAWINGS

In order to more fully understand the drawings referred to in the detailed description of the present invention, a brief description of each drawing is presented, in which:

FIG. 2 depicts an embodiment of the disclosure wherein LNG is supplied to the wellsite of a gas producing well by LNG tankers.

FIG. 3 depicts an embodiment of the disclosure wherein LNG is supplied to the wellsite of a gas producing well by bulk LNG tankers located away from the wellsite.

DETAILED DESCRIPTION OF THE PREFERRED EMBODIMENTS

Figure 1:
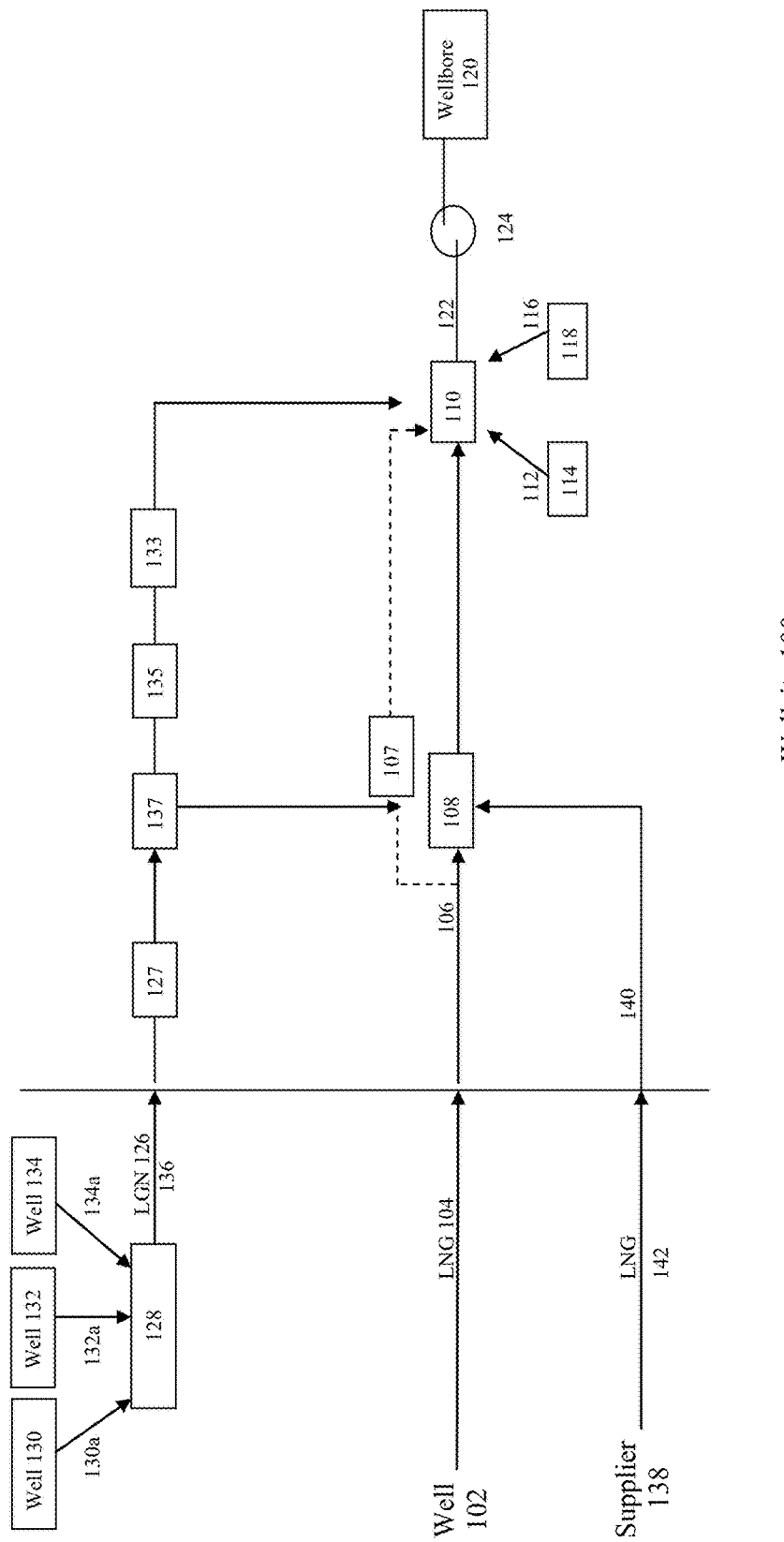
FIG. 1 depicts an embodiment of the disclosure wherein LNG is supplied to the wellsite of a gas producing well from a field-produced LNG source.

Illustrative embodiments of the disclosure are described below as they might be employed in the operation and treatment of well applications. In the interest of clarity, not all features of an actual implementation are described in this specification. It will of course be appreciated that in the development of any such actual embodiment, numerous implementation and/or specific decisions must be made to achieve the specific goals of the operator, which will vary from one implementation to another. Moreover, it will be appreciated that such a development effort might be complex and time-consuming, but may nevertheless be a routine undertaking for those of ordinary skill in the art having the benefit of this disclosure. Further aspects and advantages of the various embodiments of the disclosure will become apparent from consideration of the following description.

The productivity of a hydrocarbon-bearing formation may be enhanced by introducing into a gas producing well a non-aqueous fluid containing liquefied natural gas (LNG). LNG originates from natural gas composed predominately of methane. It may include gaseous hydrocarbons and/or atmospheric gases normally found in liquefied methane-based products generally referred to as natural gas. An exemplary mixture of LNG may be from about 75 to about 95 vol. % liquefied methane, from about 5 to about 15 vol. % ethane, with the remainder being propane and butane.

As used herein, the term "introducing" includes pumping, injecting, pouring, releasing, displacing, spotting, circulating or otherwise placing a material within the well or borehole using any suitable method known in the art.

In a preferred embodiment, a non-aqueous fracturing fluid containing LNG may be introduced into the formation at a pressure sufficient to create or enlarge a fracture.

In another preferred embodiment, the non-aqueous fracturing fluid further contains a gellant.

The fracturing fluid may be gelled with any gelling agent known in the art to be suitable for gelling wellbore fluids.

Preferably, the gellant comprises a phosphate ester gelling agent. The gellant may further comprise an activator. Suitable gellants include those set forth in U.S. Pat. Nos. 5,190,675; 5,417,287; 5,514,645; 5,571,315; 5,614,010; 5,647,900; 6,184,184; 6,602,828; and 8,084,401, all of which are herein incorporated by reference.

Preferred as phosphate esters are those prepared from a primary $C_5$-$C_{16}$ monohydric alcohol and a phosphate. Exemplary of such phosphate esters are mono-, di- and tri-alkyl esters, such as a mono-alkyl phosphate ester and alkyl orthophosphate acid esters.

Further, the gellant may be a reaction product of a phosphate ester and an activator. Conventional activators for combining with a phosphate ester include ferric ions, salts and basic iron compounds (such as ferric sulfate or ferric chloride), basic aluminum compounds (such as aluminum isopropoxide), alkali metal aluminates (such as sodium aluminate), hydrated alumina and polyvalent metal ions such as aluminum ions, gallium ions, lanthanum ions, ruthenium ions, iron ions and lanthanide rare earth series ions. Exemplary reaction products are aluminum phosphate diesters, prepared by contacting a phosphate diester gelling agent and an aluminum alkoxide activator.

Preferred gellants are the reaction products of an organic phosphate of the formula $HPO_4RR^1$ wherein R is an alkyl or alkaryl group having from 6 to about 18 carbon atoms and $R^1$ is hydrogen or an aryl, alkaryl or alkyl group having from 1 to about 18 carbons atoms and a ferric salt such as ferric ammonium citrate, succinate or tartrate or a lower alkyl substituted derivative thereof, optionally with an amine, such as amine of the formula $H_{3-n}N(C_mH_{2m}R^2)_n$ wherein n is an integer from 1 to 3, each m is independently an integer from 2 to 6 and $R^2$ is —H or —OH; or a polycarboxylic acid or an alkali metal salt thereof having 2 to 12 carbon atoms and/or lower alkyl and alkanol derivatives thereof including ferric amine citrate, ferric isopropanolamine citrate, ferric triethanolamine succinate and ferric dibutanolamine tartrate.

Further preferred are those gellants comprising a mixture of $PO(OR^3)(OH)_2$ and $PO(OR^3)_2(OH)$, wherein $R^3$ preferably contains from about 4 to about 16 carbon atoms and is formed by contacting phosphorus pentoxide with a mono-alkyl-, dialkyl- or tri-alkyl phosphate or a mixture thereof in the presence of an alcohol containing from about 4 to about 20 carbon atoms.

The activator may also be mixed with one or more amines. Thus, the gellant may be a reaction product of a trialkyl phosphate and an activator optionally reacted with a $C_8$-$C_{18}$ surface active amine to form a reaction product to which is added a $C_2$-$C_4$ monohydric alcohol.

When present, the amount of gellant in the fluid is typically greater than 50% by volume and more preferably at least 65% by volume.

LNG may be supplied to the gas producing well by a number of sources. For instance, LNG may be supplied to a gas producing well from one or more secondary wells through a flowline(s) or from a field gathering plant. Alternatively, LNG may be supplied through a pipeline which is plumbed to the wellsite of the gas producing well.

FIG. 1 depicts a schematic pathway for undertaking a method of fracturing on wellsite 100 of a gas producing well wherein LNG is supplied to the wellhead 102 of the gas producing from a field-produced source. As illustrated, LNG may be supplied to a wellsite from one or more secondary producing wells. In such instances, the LNG may be supplied to the gas producing well through a flowline which extends from a secondary well.

As illustrated in FIG. 1, LNG 104 produced from secondary gas well 102 may be delivered through flowline 106 to wellsite 100. Wellsite 100 may be onshore or offshore. At wellsite 100, LNG 104 may be introduced into storage tank 108. The storage tank may be regulated by an inert tank valve for regulating the flow of LNG. The storage tank may contain a vaporizer in order to maintain vapor pressures and reduce line pressure drops in order that higher injection rates, in excess of 30 BPM, may be obtained. In addition, controlled vapor pressure storage tanks eliminate a decreasing temperature profile on the LNG.

From storage tank 108, LNG 104 may be metered into blender 110 where it may be admixed with gellant 112 stored in gellant storage tank 114. Proppant 116 stored in proppant storage tank 118 may also be fed into blender 110. Gellant 112 is preferably of a viscosity sufficient for delivering proppant 116 into wellhead 120.

FIG. 1 shows the blended fracturing fluid 122 being pumped from high pressure pump 124 into wellhead 120. A cryogenic pump may be used to pump the fluid into the wellhead. Wellhead isolation equipment may be mounted to the wellhead.

Alternatively, LNG 104 may be fed through metering device 107 directly from secondary well 102 into blender 110 at wellsite 100.

LNG is converted to a gas downhole after reaching a critical temperature and pressure is reduced. Critical temperature is referred to herein as the temperature above which the LNG cannot exist as a liquid regardless of pressure.

Typically, the critical temperature of LNG is between from about 100° F. to about 250° F.

Use of LNG provides for rapid clean-up and no residual liquids are left in the formation. In addition, use of LNG renders the need to flare off gases unnecessary.

Alternatively, field (unprocessed or raw) gas from one or more secondary wells may be fed through gathering line 136 from central gathering unit 128 into compressed station 137. The converted gas, now LNG, may be introduced into LNG storage tank 108 or fed through metering device 133 into fracturing blender 110. FIG. 1 demonstrates field gas from secondary wells 130, 132, and 134 through flowlines 130a, 132a, and 134a, respectively. Central gathering unit 128 may be in close proximity to wellsite 100 or be remote from the site. For instance, central gathering unit may be as close as 100 yards from wellsite 100 or five miles from the site.

As illustrated in FIG. 1, unprocessed or raw gas from central gathering unit 128 exiting through one or more gathering lines (shown in FIG. 1 as single flowline 136) may be fed into separator 127 to remove various components including water, dust, acid gases, helium, water and heavy hydrocarbons.

The gas is then compressed at gathering compression unit 137 and condensed into a liquid at close to atmospheric pressure (maximum pressure of about 25 kPa/3.6 psi) by cooling to approximately −260° F.

The LNG exiting gathering compression unit 137 may then be fed into field gathering storage tank 135 or storage tank 108. Alternatively, LNG from gathering compression unit 137 may be fed through metering device 133 into fracturing blender 110.

Further, FIG. 1 shows LNG 142 may be delivered to wellsite 100 via pipeline 140 from LNG supplier 138. Pipeline 140 is plumbed to wellsite 100. At wellsite 100, the LNG may be stored in LNG storage vessel 108. LNG may then be fed to blender 110 as needed.

It is understood that there may be one or more storage tanks for LNG as well as one or more blenders may be presented at wellsite 100. Thus, LNG 126 originating from central gathering 128 and LNG 142 originating from LNG supplier 138 may be fed into separate storage tanks for later blending. Alternatively, there may be more than one blender at wellsite 100. For instance, LNG 126 and LNG 142 may be fed from one or more storage tanks into one or more different blenders on wellsite 100.

Alternatively, the LNG may be supplied to a wellsite of a gas producing well in one or more bulk tankers from one or more suppliers; the LNG being off-loaded from the tanker onto one or more LNG storage tanks located at the wellsite.

As depicted in FIG. 2, LNG 204 is illustrated as being supplied from LNG supplier 206. As illustrated, LNG 202 may be loaded into LNG storage tank 208 on wellsite 200. On a needed basis, LNG may be pumped into fracturing blender 210 from LNG storage tank 208. In fracturing blender 210, LNG 20 may be admixed with gellant 212 from gellant storage tank 214 and proppant 216 from proppant storage tank 218. Blended fracturing fluid 220 may then be pumped via high pressure pump 222 into wellhead 224 of the gas producing well.

It is understood that there may be one or more LNG storage tanks and fracturing blenders at wellsite 200. In addition, when a gelled fluid is desired for use, there may be one or more gellant storage tanks and proppant tanks at the wellsite. For instance, proppant from proppant tank 216 may be fed into multiple fracturing blenders or proppant from multiple proppant tanks may be fed into fracturing blender 210. Likewise, for instance, gellant from gellant tank 212 may be fed into multiple fracturing blenders or gellant from multiple gellant tanks may be fed into fracturing blender 210. Further, LNG from LNG supplier tanker 204 may be fed into multiple LNG storage tanks.

FIG. 3 depicts an alternative arrangement wherein LNG is supplied onto wellsite 300 by supplier 301 in one or more bulk LNG tankers 305. LNG is transferred from bulk LNG tanker 305 to LNG storage tanker truck 302 at the wellsite and stored in tanker truck 302. A bulk LNG tanker is further used to carry additional or replacement LNG onto the wellsite, as needed.

As used herein, a bulk LNG tanker truck and a LNG storage tanker truck refers to a vehicle for delivery of LNG within the standards set by the U.S. Department of Transportation (DOT). The trucks are double-walled. LNG is transported at approximately −250 degrees. The vehicle has a pressurized LNG tank. The inner tanks of the trucks are made of thick aluminum designed to withstand up to 100 pounds of pressure. There is a steel outer shell around the outside of the inner tank.

The pressurized tank does not use a pump; it uses a series of relief valves to release pressure. Additionally, tank pressure is used to transfer the LNG from the tank to the storage facility.

Referring to FIG. 3, LNG storage tanker truck 302 may be located at wellsite 300 and used on-site. LNG 303 from storage tanker truck 302 may be fed into fracturing blender 304, as needed. When desired, gellant 306 may be metered from gellant storage tank 308 into fracturing blender 304 and proppant 310 may be metered from proppant storage tank 312 into fracturing blender 304.

After being mixed in fracturing blender 304, blended fracturing fluid 314 is pumped through high pressure pump 316 and enters wellhead 318.

LNG may be replenished onsite by transfer of LNG from LNG tanker truck 305 to LNG storage tanker truck 302 at the wellsite.

One or more LNG storage tanker trucks 302 may be located onsite. In addition more than one fracturing blenders, gellant storage tanks and proppant tanks may be located at wellsite 300. For instance, proppant from proppant tank 310 may be fed into multiple fracturing blenders or proppant from multiple proppant tanks may be fed into fracturing blender 304. Likewise, gellant from gellant storage tank 308 may be fed into multiple fracturing blenders or gellant from multiple gellant tanks may be fed into fracturing blender 304.

Gas produced from the well may be directly fed into a pipeline without subjecting the produced gas to flowback treatment. The use of LNG provides for the recovery of natural gas without loss or damage to the environment. Along with being environmentally sound, the method disclosed herein is very economical.

Suitable proppants for use in the disclosure include those conventionally known in the art including quartz, sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further the proppant may include porous ceramics or organic polymeric particulates. The porous particulate material may be treated with a non-porous penetrating material, coating layer or glazing layer. The amount of proppant in the non-aqueous fracturing fluid is typically between from about 0.5 to about 12.0, preferably between from about 1 to about 8.0, pounds of proppant per gallon of fluid.

The fluid can also contain other conventional additives common to the well service industry such as surfactants, corrosion inhibitors, and the like.

In one embodiment, when a gelled fluid is used, the fluid may contain a breaker for reducing the viscosity of the fluid. Any material(s) suitable for imparting viscosity reduction characteristics to the gelled fluid may be employed as breaker. Examples of suitable materials include, but are not limited to, oxidizing agents, amines like triethanolamines, acids, acid salts, acid-producing materials, etc. Suitable acid breakers include hydrochloric acid, acetic acid, formic acid, polyglycolic acid and sulfamic acid as well as acid salts, such as sodium bisulfate. Suitable oxidizing agents are alkaline earth peroxides like calcium peroxide, persulfates like ammonium persulfate, organic peroxides, sodium perborate and a hydrochlorite bleach.

The breaker may also be encapsulated. In an embodiment, the breaker is an encapsulated percarbonate, perchlorate, peracid, peroxide, or persulfate. Exemplary encapsulated breakers include those oxide or peroxide breaker encapsulated in an inert porous encapsulant, such as those disclosed in U.S. Pat. No. 6,184,184.

When present, the gelled emulsion may contain between from about 0.2 to about 30, more typically between from about 2 to about 25, $kg/m^3$ of oxidative or acidic breaker.

The fluid described herein may further be used in a sand control treatment operation of a gas producing well. The "proppant" referenced herein would be used as the sand control particulate. In one exemplary embodiment, a gravel pack operation may be carried out on a wellbore that penetrates a subterranean formation to prevent or substantially reduce the production of formation particles into the wellbore from the formation during gas production. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. The LNG containing the sand control particulate may be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during the production of gas from the formation, while at the same time allowing passage of formation fluids from the subterranean formation through the screen into the wellbore. The fluid is typically gelled.

As an alternative to use of a screen, the sand control method may use the lightweight polyamide and/or substantially neutrally buoyant particulates in accordance with any method in which a pack of particulate material is formed within a wellbore that is permeable to gas produced from a wellbore but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The method of using LNG as disclosed herein is especially useful in well treatment operations of coal bed methane formations and tight formations (including tight gas shale reservoirs exhibiting complex natural fracture networks). To effectively access such formations, the well is often drilled horizontally and then subjected to one or more fracture treatments to stimulate production.

The foregoing disclosure and description of the disclosure is illustrative and explanatory thereof, and various changes in the size, shape, and materials, as well as in the details of illustrative construction and assembly, may be made without departing from the spirit of the invention.

What is claimed is:

1. A method for enhancing the productivity of a hydrocarbon-bearing formation penetrated by a gas producing well comprising (i) preparing a non-aqueous fluid comprising a blend of liquefied natural gas and a gellant; (ii) pumping the blend into the wellhead of the well under pressure, the pressure being sufficient to create or enlarge a fracture in the subterranean formation.

2. The method of claim 1, wherein the gellant is a phosphate ester.

3. The method of claim 1, wherein the non-aqueous fluid is prepared in a blender and proppant is metered into the blender and wherein the non-aqueous fluid containing the proppant is pumped into the wellhead of the well, the proppant being delivered into the wellbore by the gellant.

4. A method for enhancing the productivity of a hydrocarbon-bearing formation penetrated by a gas producing well comprising pumping into the gas producing well a non-aqueous fluid a blend comprising liquefied natural gas and a gellant and creating or enlarging a fracture in the subterranean formation with the non-aqueous fluid, wherein the liquefied natural gas is either:
   (a) supplied from a producing well via a flowline extending from the producing well to the gas producing well;
   (b) supplied from a field gathering plant;
   (c) supplied from a pipeline which is plumbed to the wellsite of the gas producing well;
   (d) transferred from a storage tank on the wellsite of the gas producing well;
   (e) transported to the storage tank from a source distant from the wellsite; or
   (f) supplied from a tanker located at the wellsite.

5. The method of claim 4, wherein the liquefied natural gas originates from natural gas supplied from a producing well via a flowline extending from the producing well to the gas producing well.

6. The method of claim 4, wherein the liquefied natural gas is supplied from a field gathering plant.

7. The method of claim 4, wherein the liquefied natural gas is supplied from a pipeline which is plumbed to the wellsite of the gas producing well.

8. The method of claim 4, wherein the liquefied natural gas is transferred from a storage tank on the wellsite of the gas producing well.

9. The method of claim 4, wherein the liquefied natural gas is transported to the storage tank from a source distant from the wellsite.

10. The method of claim 4, wherein the liquefied natural gas is supplied from a tanker located at the wellsite.

11. A method of fracturing a subterranean formation comprising pumping into a gas producing well penetrating the subterranean formation a non-aqueous fracturing fluid at a pressure sufficient to create or enlarge a fracture, the non-aqueous fracturing fluid comprising liquefied natural gas, gellant and proppant and wherein the natural gas, gellant and proppant are blended to form the non-aqueous fracturing fluid at the wellsite of the gas producing well.

12. The method of claim 11 wherein the gellant comprises a mono-, di- or tri-alkyl phosphate ester.

13. The method of claim 11, wherein the liquefied natural gas supplied to the wellsite of the gas producing well is stored in a storage tank at the wellsite.

14. The method of claim 11, wherein the liquefied natural gas originates from natural gas supplied to the wellsite of the gas producing well originates from at least one secondary well through a flowline.

15. The method of claim 14, wherein the flowline extends from the at least one secondary well to a storage tank at the wellsite of the gas producing well and wherein the liquefied natural gas is stored in the storage tank at the wellsite.

16. The method of claim 11, wherein the liquefied natural gas supplied to the wellsite of the gas producing well originates from field gas.

17. The method of claim 16, wherein the field gas is from a central gathering unit.

18. The method of claim 16, wherein the liquefied natural gas is formed by compression of the field gas and wherein at least one of water, dust, acid gas, helium or heavy hydrocarbons are separated from the field gas prior to compression of the field gas.

19. The method of claim 16, wherein liquefied natural gas is formed by compression of the field gas and wherein the liquefied natural gas is stored in a storage tank at the wellsite of the gas producing well.

20. The method of claim 11, wherein the liquefied natural gas is supplied to the wellsite of the gas producing well through a pipeline.

21. The method of claim 11, wherein the liquefied natural gas is supplied to the wellsite of the gas producing well from a tanker.

22. A sand control method for a wellbore penetrating a gas producing subterranean formation, comprising:
   introducing into the wellbore a non-aqueous fluid comprising liquefied natural gas, a gellant and a sand control particulate;
   placing the sand control particulate adjacent the subterranean formation to form a fluid-permeable pack capable of reducing or substantially preventing the passage of formation particles from the subterranean formation into the wellbore while allowing passage of gaseous hydrocarbons from the subterranean formation into the wellbore.

* * * * *